US010839212B2

(12) United States Patent
Feingersh

(10) Patent No.: US 10,839,212 B2
(45) Date of Patent: Nov. 17, 2020

(54) SYSTEMS AND METHODS FOR DETECTING IMAGED CLOUDS

(71) Applicant: ISRAEL AEROSPACE INDUSTRIES LTD., Lod (IL)

(72) Inventor: Tal Feingersh, Yehud (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 220 days.

(21) Appl. No.: 16/069,021

(22) PCT Filed: Jan. 1, 2017

(86) PCT No.: PCT/IL2017/050004
§ 371 (c)(1),
(2) Date: Jul. 10, 2018

(87) PCT Pub. No.: WO2017/130184
PCT Pub. Date: Aug. 3, 2017

(65) Prior Publication Data
US 2019/0026532 A1    Jan. 24, 2019

(30) Foreign Application Priority Data

Jan. 28, 2016 (IL) .......................................... 243846

(51) Int. Cl.
*G06K 9/00* (2006.01)
*G06K 9/03* (2006.01)
(Continued)

(52) U.S. Cl.
CPC ....... *G06K 9/0063* (2013.01); *G06K 9/00697* (2013.01); *G06K 9/036* (2013.01);
(Continued)

(58) Field of Classification Search
CPC ........ G06K 9/0063; G06T 2207/10032; G06T 2207/30181
See application file for complete search history.

(56) References Cited

U.S. PATENT DOCUMENTS

| 8,170,282 B1 | 5/2012 | Roskovensky |
|---|---|---|
| 2014/0029844 A1* | 1/2014 | Padwick .............. G06K 9/0063 382/165 |

(Continued)

FOREIGN PATENT DOCUMENTS

| CN | 100432698 C | 11/2008 |
|---|---|---|
| CN | 101246545 B | 7/2010 |
| CN | 101799921 A | 8/2010 |

OTHER PUBLICATIONS

"Geospatial Information derived from satellite and other sources;" http://www.mdacorporation.com/corporate/surveillance_intelligence/geospatial_services.cfm; Dec. 13, 2015; 1 page.

(Continued)

*Primary Examiner* — Ross Varndell
(74) *Attorney, Agent, or Firm* — Oliff PLC

(57) ABSTRACT

A computer-implemented method for identifying clouds in a digital image, comprising pixels, of a scene, the method comprising quantifying pixel-level characteristic/s in each of a multiplicity of pixels within a digital image of a scene; comparing function/s of the pixel-level characteristic/s to threshold/s thereby to generate comparison result/s; and using a controller for generating an output identifying clouds in the digital image, including identifying presence of cloudiness at at least one first pixel in the digital image, at least partly because the at least one comparison result indicates that the first pixel falls below the threshold/s, and identifying absence of cloudiness at at least one second pixel (Continued)

in the digital image, at least partly because the at least one comparison result indicates that the second pixel exceeds the threshold/s.

20 Claims, 5 Drawing Sheets

(51) Int. Cl.
| | |
|---|---|
| *G06K 9/32* | (2006.01) |
| *G06K 9/46* | (2006.01) |
| *G06K 9/62* | (2006.01) |
| *G06T 7/00* | (2017.01) |

(52) U.S. Cl.
CPC ........... *G06K 9/3233* (2013.01); *G06K 9/469* (2013.01); *G06K 9/4647* (2013.01); *G06K 9/6202* (2013.01); *G06K 9/622* (2013.01); *G06K 9/6232* (2013.01); *G06T 7/0002* (2013.01); *G06K 2009/6213* (2013.01); *G06T 2207/10041* (2013.01); *G06T 2207/30168* (2013.01); *G06T 2207/30192* (2013.01)

(56) References Cited

U.S. PATENT DOCUMENTS

| | | | |
|---|---|---|---|
| 2014/0050403 A1 | 2/2014 | Ulusoy et al. | |
| 2015/0294152 A1* | 10/2015 | Florentz | G06K 9/00624 382/103 |

OTHER PUBLICATIONS

Weather Services; http://www.mdaus.com/Products-0024-Services/Weather-Services.aspx; MDA Information Systems LLC; Dec. 27, 2015; 1 page.

Weather Data; http://www.mdaus.com/products/weather-data; MDA Information Systems LLC Weather Data; May 24, 2016; pp. 1-2.

Meteorological Data Products and Services; http://www.mdaus.com/data/files/Site_18/Data_Full_Color_Website_Advert.pdf; MDA Weather Services; Dec. 27, 2015; 1 page.

Agricultural Weather; http://www.mdaus.com/products/agricultural-weather; MDA Information Systems Agricultural Weather; May 24, 2016; pp. 1-2.

Hagolle et al.; "A multi-temporal method for cloud detection, applied to Formosat-2, VENµS, Landsat and Sentinel-2 images;" Remote Sensing of Environment; Elsevier; 2010; 114 (8); pp. 1747-1755.

Latry et al.; "Cloud Detection with SVM technique;" In Geoscience and Remote Sensing Symposium; 2007; IGARSS 2007; IEEE International; pp. 448-451.

Petrucci et al.; "MACCS : Multi-Mission Atmospheric Correction and Cloud Screening tool for high-frequency revisit data processing;" Image and Signal Processing for Remote Sensing XXI; Proc. of SPIE; vol. 9643; 2015; pp. 964307-1-9.

Champion; "Automatic Cloud Detection From Multi-Temporal Satellite Images: Towards the Use of Pléiades Time Series;" International Archives of the Photogrammetry, Remote Sensing and Spatial Information Sciences; vol. XXXIX-B3; 2012; XXII ISPRG Congress; Aug. 25-Sep. 1, 2012; pp. 559-564.

Richards et al.; "Remote Sensing Digital Image Analysis;" 4th Edition; Springer-Verlag Berlin Heidelberg; 2006; the entire document.

Baseski et al.; "Texture and Color Based Cloud Detection;" 7th International Conference on Recent Advances in Space Technologies (RAST); IEEE; Jun. 16, 2015; pp. 311-315.

Bhangale et al.; "Cloud Detection in Satellite Imagery Using Graphics Processing Units;" IEEE International Geoscience and Remote Sensing Symposium—IGARSS; Jul. 21, 2013; pp. 270-273.

Knyazikhin et al.; "Mathematical aspects of BRDF modeling: adjoint problem and Green's function;" Remote Sensing Reviews; vol. 18, No. 2-4; Sep. 1, 2000; pp. 263-280.

Russ; "Opening and closing in Ch. 7 Processing Binary Images;" The image processing handbook; CRC Press; Jul. 19, 1999; pp. 460-464.

Coakley et al.; "Cloud Cover From High-Resolution Scanner Data: Detecting and Allowing for Partially Filled Fields of View;" Journal of Geophysical Research; vol. 87, No. C7; Jun. 20, 1982; pp. 4917-4932.

* cited by examiner

SYSTEMS AND METHODS FOR DETECTING IMAGED CLOUDS

REFERENCE TO CO-PENDING APPLICATIONS

No priority is claimed at this time (2016).

FIELD OF THIS DISCLOSURE

The present invention relates generally to image processing and more particularly to recognizing objects.

BACKGROUND FOR THIS DISCLOSURE

Cloud data is useful in a huge variety of technologies such as but not limited to usage in air quality modeling and pollutant dispersion modeling, in weather forecasting, in research e.g. re meteorological variability, and in aerial surveillance of scenes of interest which may be occluded by clouds—for various applications including agriculture, water quality and soil quality.

"An optical remote sensing image cloud detection method", Chinese patent document number CN 200910077651 by Single Na et al published 11 Aug. 2010 (Publication number CN101799921), describes a cloud basic processing unit according to a fractal dimension division inter alia.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to provide more accurate cloud detection (aka "cloud screening" or "cloud mapping") when imaging cloudy scenes. For example, even today, some organizations are forced to resort to human operators to filter out inadequate satellite images rather than filtering out inadequate satellite images automatically by relying on cloud detection functionality with high enough accuracy.

Certain embodiments seek to provide more accurate cloud detection e.g. in panchromatic or monochromatic images, in which at least one homogeneous (low heterogeneity) and bright area in at least one image is classified as being clouded and at least one heterogenous (high heterogeneity) or dark area in at least one image is classified as not being clouded. Certain embodiments seek to detect non-selective clouds typically so thick that substantially no wavelengths pass through at the electro-optically relevant portion of the electro-magnetic spectrum.

Certain embodiments seek to provide an easy to operate method which does not require stereo imaging to generate several images acquired from different angles and/or at different times or different spectral wavelengths, nor are thermal Infrared imaging or fractal dimensions required.

The present invention typically includes at least the following embodiments:

Embodiment 1

A computer-implemented method for identifying clouds in a digital image, comprising pixels, of a scene, the method comprising:

quantifying at least one pixel-level characteristic in each of a multiplicity of pixels within a digital image of a scene;

comparing at least one function of the at least one pixel-level characteristic to at least one threshold thereby to generate at least one comparison result; and using a controller for generating an output identifying clouds in the digital image, including at least one of:

identifying presence of cloudiness at at least one first pixel in the digital image, at least partly because the at least one comparison result indicates that the first pixel falls below the at least one threshold, and identifying absence of cloudiness at at least one second pixel in the digital image, at least partly because the at least one comparison result indicates that the second pixel exceeds the at least one threshold.

Embodiment 2

A method according to any of the preceding claims wherein the quantifying comprises quantifying heterogeneity and brightness in each of a multiplicity of locations in a digital image of a scene;

the comparing comprises comparing at least one function of at least one of the heterogeneity and the brightness to at least one threshold thereby to generate at least one comparison result indicating whether an individual location from among the multiplicity of locations is both homogeneous and bright, or whether the individual location is heterogeneous and/or dark; and and the generating an output comprises at least one of:

identifying presence of cloudiness at at least one first location in the digital image, at least partly because the at least one comparison result indicates that the first location is both homogeneous and bright to an extent determined by the at least one threshold, and identifying absence of cloudiness at at least one second location in the digital image, at least partly because the at least one comparison result indicates that the second location is heterogeneous and/or dark to an extent determined by the at least one threshold.

It is appreciated that the output need not be binary i.e. need not stipulate merely that each pixel either is part of a cloud or is not. At least one intermediate level of certainty may be employed e.g. the output may stipulate that each pixel either is a part of a cloud or is not a part of a cloud, or is possibly a part of a cloud but possibly is not part of a cloud e.g. if a particular pixel's brightness falls below a first cloud-determining threshold above which cloudiness is deemed present, but falls above a second threshold below which clouds are deemed absent; or if a particular pixel's heterogeneity falls below a first cloud-determining threshold above which cloudiness is deemed absent, but falls above a second threshold below which clouds are deemed present.

The function/s of heterogeneity and brightness may comprise the unity function in which case heterogeneity and brightness data is compared to threshold/s directly.

The controller may include one or more hardware devices e.g. chips, which may be co-located or remote from one another.

Embodiment 3

A method according to any of the preceding embodiments and also comprising aggregating adjacent locations at which cloudiness has been identified into pixel-clusters.

Embodiment 4

A method according to any of the preceding embodiments and also comprising, for each pixel-cluster thus found, generating an output indicating presence of a cloud including an indication of all locations within the pixel-cluster.

Embodiment 5

A method according to any of the preceding embodiments wherein the comparing comprises:
comparing functions of heterogeneity and brightness to define a LNDCI;
generating a scattergram representing a distribution of the LNDCI and a function of the heterogeneity and define a gain parameter by computing a slope of a linear model fitted to the scattergram; and
comparing a function of the gain to at least one cloud-defining threshold value.

Embodiment 6

A method according to any of the preceding embodiments wherein the digital image comprises at least one of: a panchromatic image; and a monochromatic image.

Embodiment 7

A method according to any of the preceding embodiments wherein the function comprises a unity function.

Embodiment 8

A method according to any preceding embodiment wherein the function comprises at least some of the following: image space and feature space texture analysis, convolution, classification of clouds, and differentiation of clouds from other background elements in a remotely sensed image.

Embodiment 9

A method according to any of the preceding embodiments wherein the digital image is imaged by satellite.

Embodiment 10

A method according to any of the preceding embodiments and also comprising using the output as an input to at least one of the following: a computerized meteorological process; a computerized oceanographic process, a computerized fishing management process; a computerized agricultural process; a computerized biodiversity conservation management process; a computerized forestry management process, a computerized landscaping process; a computerized geological process, a computerized cartographic process, a computerized regional planning process.

Embodiment 11

A method according to any of the preceding embodiments wherein the digital images comprises an array of pixels and wherein each of the locations comprises at least one pixel.

Embodiment 12

A method according to any of the preceding embodiments wherein the threshold is determined in a set-up stage in which relatively bright and homogeneous clusters of points in the feature space are differentiated from at least one of less bright clusters of points in the feature space and less homogeneous clusters of points in the feature space.

Embodiment 13

A method according to any of the preceding embodiments and wherein the generating an output also comprises identifying at least one location whose comparison result comprises an intermediate-level result indicating that the location is not homogeneous and bright to an extent determined by the at least one threshold, but also is not heterogeneous and/or dark to an extent determined by the at least one threshold.

Embodiment 14

A method according to any of the preceding embodiments and also comprising:
determining whether or not a region of interest within the digital image is occluded by the location at which the at least one comparison result indicates that the location is both homogeneous and bright; and
discounting the image if so and utilizing the image if not.

Embodiment 15

A system for identifying clouds in a digital image of a scene, the system comprising:
a processor operative for quantifying heterogeneity and brightness in each of a multiplicity of locations in a digital image of a scene and for comparing at least one function of the heterogeneity and the brightness to at least one threshold thereby to generate at least one comparison result indicating whether an individual location from among the multiplicity of locations is both homogeneous and bright, or whether the individual location is heterogeneous and/or dark; and
an output generator operative for generating an output identifying clouds in the digital image, including at least one of:
generating an output identifying presence of cloudiness at at least one first location in the digital image, at least partly because the at least one comparison result indicates that the first location is both homogeneous and bright to an extent determined by the at least one threshold, and
generating an output identifying absence of cloudiness at at least one second location in the digital image, at least partly because the at least one comparison result indicates that the second location is heterogeneous and/or dark to an extent determined by the at least one threshold.

Embodiment 16

A method according to any of the preceding embodiments and also comprising discounting at least one location at which cloudiness has been identified and nonetheless the location does not belong to any of the clusters by generating an output indicating presence of cloudiness only in "clustered" locations found to belong in a cluster and not in "non-clustered" locations at which cloudiness has been identified and nonetheless the location does not belong to any of the clusters.

Embodiment 17

A method according to any of the preceding embodiments wherein the comparing at least one function of the heterogeneity and the brightness to at least one cloud-defining threshold comprises:

comparing a first function of the heterogeneity to a first cloud-defining threshold in a feature space, comprising at least one heterogeneity threshold value in the feature space; and comparing a second function of the brightness to a second cloud-defining threshold in a feature space, comprising at least one brightness threshold value in the feature space.

Embodiment 18

A system according to any of the preceding embodiments wherein the digital image is imaged by an airborne platform.

Embodiment 19

A method according to any of the preceding embodiments wherein the at least one pixel comprises a single pixel.

Embodiment 20

A method according to any of the preceding embodiments wherein the at least one pixel comprises a group of neighboring pixels.

Embodiment 21

A system according to any of the preceding embodiments wherein the output indicates that cloudiness is present at all first locations hence the image is completely clouded.

Embodiment 22

A system according to any of the preceding embodiments wherein the output indicates that cloudiness is absent from all second locations hence the image is completely cloud free.

Embodiment 23

A method according to any of the preceding embodiments wherein the relatively bright and homogeneous feature-space point-clusters are identified using a clustering method.

Embodiment 24

A method according to any of the preceding embodiments wherein the feature space clustering method includes at least one of:
transformations of the clusters' shapes in the feature space;
projection of the clusters to new feature space axes;
application of derivative approaches on the primers/boundaries of the clusters.

Embodiment 25

A method according to any of the preceding embodiments wherein the at least one function comprises an LNDCI operator.

Embodiment 26

A method according to any of the preceding embodiments wherein the at least one function comprises a PCOT operator.

Embodiment 27

A computer program product, comprising a non-transitory tangible computer readable medium having computer readable program code embodied therein, the computer readable program code adapted to be executed to implement a method for identifying clouds in a digital image of a scene, the method comprising:

quantifying heterogeneity and brightness in each of a multiplicity of locations in a digital image of a scene;

comparing at least one function of at least one of the heterogeneity and the brightness to at least one threshold thereby to generate at least one comparison result indicating whether an individual location from among the multiplicity of locations is both homogeneous and bright, or whether the individual location is heterogeneous and/or dark; and using a controller for generating an output identifying clouds in the digital image, including at least one of:
identifying presence of cloudiness at at least one first location in the digital image, at least partly because the at least one comparison result indicates that the first location is both homogeneous and bright to an extent determined by the at least one threshold, and
identifying absence of cloudiness at at least one second location in the digital image, at least partly because the at least one comparison result indicates that the second location is heterogeneous and/or dark to an extent determined by the at least one threshold.

Embodiment 28

A method according to any of the preceding embodiments wherein the function comprises one of the following: a PCOT function; an LNDCI function; an NDCI function, a B function; an H function.

Embodiment 29

A method according to any of the preceding embodiments wherein at least one threshold is determined in a set-up stage in which relatively bright and under-threshold PCOT clusters of points in the feature space are differentiated from at least one of less bright clusters of points in the feature space and over-threshold PCOT clusters of points in the feature space.

Certain methods shown and described herein are advantageous in view of their typically being able to achieve accurate cloud detection or cloud "screening" for a wide variety of situations imaged e.g. by satellite thereby to generate "data" such as but not limited to full-size monochromatic or panchromatic ("PAN") satellite images, including images with no clouds at all, images with clouds but lacking any apparent cloud shadows, images with cloud shadows but lacking clouds, and images which are entirely cloudy.

Certain methods shown and described herein are typically able to achieve accurate cloud detection or cloud "screening" using only a single remotely sensed panchromatic image in the visible and/or near-infrared range of the electromagnetic spectrum, typically even without any other sensed data (e.g. no imagery from different imaging angles, or at different times or at different wavelengths, or thermal data) or meta-data.

The following terms may be construed either in accordance with any definition thereof appearing in the prior art literature or in accordance with the specification, or as follows:

Region of Interest (ROI):
Intended to include a portion of an input image or of any image derived therefrom, typically comprising plural pixels.

Brightness Image (Denoted B for Whole Image, and b if Subset of the Image, in FIG. 1):

Intended to include an input remotely-sensed image data e.g. a raw satellite image Homogeneity/Heterogeneity or Homogeneity or Heterogeneity:

Intended to include a dimension or characteristic or feature of an image location e.g. cluster of pixels; the extent to which the image location's gray level variation is homogeneous or heterogeneous relative to other image locations; typically each location has a numerical value representing its homogeneity/heterogeneity; if that value is high the location is considered heterogeneous whereas if that value is low the location is considered homogeneous. Denoted H if the image location includes the whole image, denoted h if the image location includes less than the entirety of the image Image Space:

Intended to include an image including clusters of plural pixels, and representing real world objects such as but not limited to, "roof", "lake", "cloud". The image may for example comprise a "b" image and/or an "h" image.

Feature Space:

Intended to include a statistical or probability space, representing frequency of occurrence of certain values in two or more images e.g. in both a "b" image and an "h" image. May be used to discriminate cloud pixels from other pixels. For example, H may be plotted against NDCI (where for each pixel in each of the b and h image subsets NDCI=(b−h)/(b+h), H may be plotted against LNDCI e.g. to determine a linearly fitted model for the H vs. LNDCI relationship, H may be plotted against a PCOT value depending inter alia on gain (slope of the linear fitted model referred to above), and B may be plotted against PCOT (and may subsequently be thresholded), heterogeneity may be plotted against brightness e.g. as shown in FIG. 2 and (with example data points) in FIG. 5.

Feature Cluster:

Intended to include a cluster or set of adjacent points in a feature-space that represents a set of pixels in one or more images.

Also provided, excluding signals, is a computer program comprising computer program code means for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

Methods and systems included in the scope of the present invention may include some (e.g. any suitable subset) or all of the functional blocks shown in the specifically illustrated implementations by way of example, in any suitable order e.g. as shown.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality herein may be implemented in software, firmware, hardware or any combination thereof. Functionality stipulated as being software-implemented may be implemented by an equivalent hardware module and vice-versa.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Figure 1:
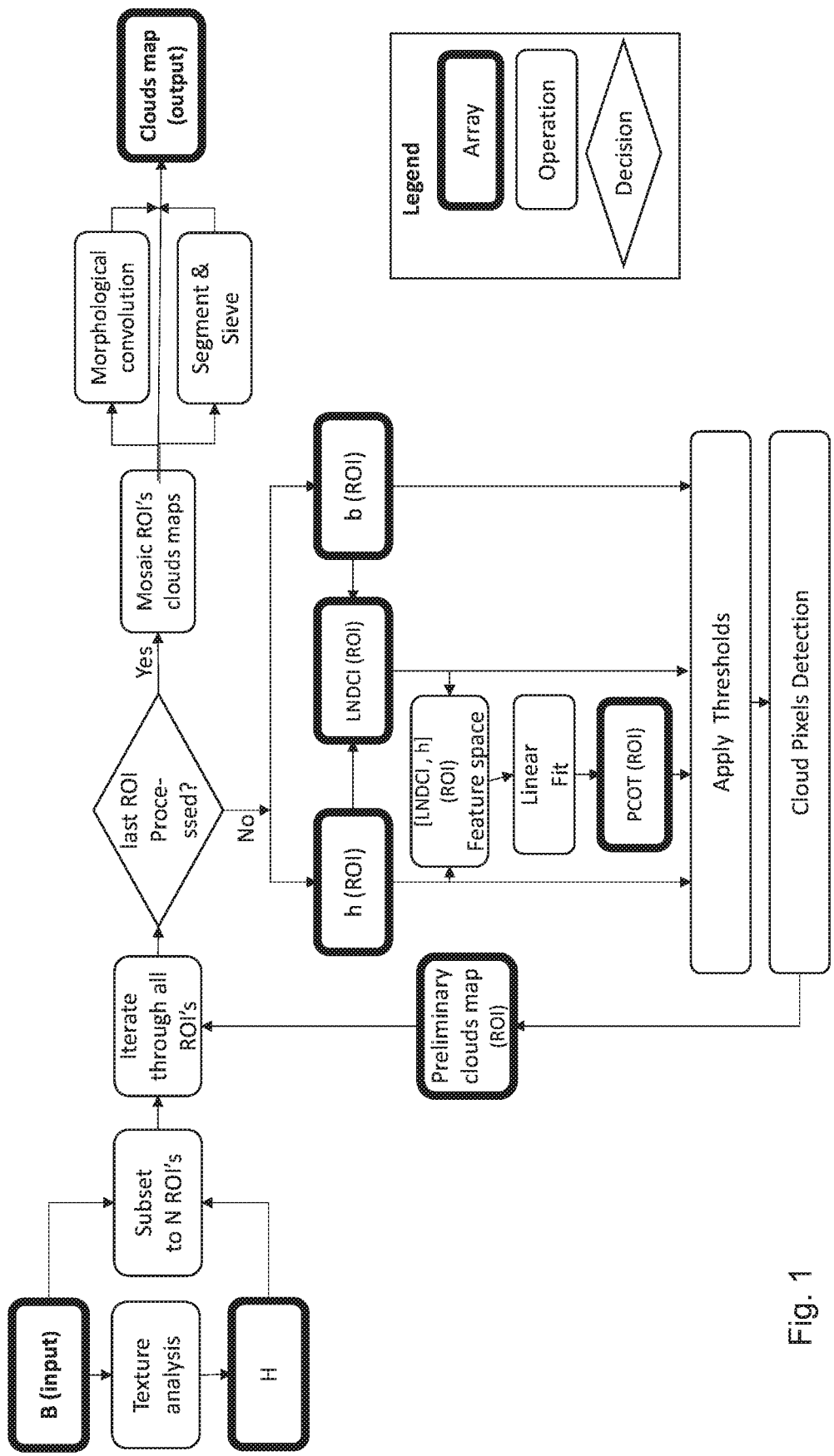
FIG. 1 is an example workflow of a Cloud Detection system and method in accordance with certain embodiments.

FIG. 1 is an example workflow of a cloud detection system and method in accordance with certain embodiments; any or all of the functionalities therein may be provided. Blocks indicated in bold represent images or ROI's or intermediate or final computations derived therefrom. Typically, the input to the method of FIG. 1 includes a brightness image B e.g. raw (or radiometrically calibrated) satellite image. H is the homogeneity/heterogeneity data range result which may be derived from B e.g. as described herein in operation 110 of FIG. 3.

Intermediate outputs generated by the workflow of FIG. 1 may include: LNDCI, the base 10 logarithm (say) of an NDCI, Normalized-Difference Cloud Index, PCOT, a transformation of LNDCI according to the gain of the linear fit to the [H,LNDCI] feature space—optimized for clouds in panchromatic or monochromatic remotely sensed imagery. Output cloud maps generated by the workflow of FIG. 1 may include any or all of a cloud map without sieving or morphological convolution, a cloud map with both, a cloud map with sieving, but without morphological convolution, and a cloud map with morphological convolution, but without sieving. According to certain embodiments, some operations may be defined as user-controllable options e.g. those indicated by dotted lines in FIG. 1. Alternatively, all operations are pre-defined rather than being user-controllable. It is appreciated that any suitable set of operations may be defined as user-controllable and the indication thereof in FIG. 1 is merely by way of example.

Cloud detection methods are now described which are particularly useful when applied to the many real life images in which clouds are typically the only large, bright, homogeneous objects in the image. It turns out that gray, rather than white clouds, are still typically brighter than their backgrounds.

Panchromatic or monochromatic imagery of the Earth's surface is produced, inter alia, by satellites, such as QuickBird, Worldview, EROS, GeoEye and IKONOS. Often, the geometric resolution of the resulting images is very high, e.g. each pixel may correspond to a about 0.5 m×0.5 m area on the surface of the earth.

Figure 3:
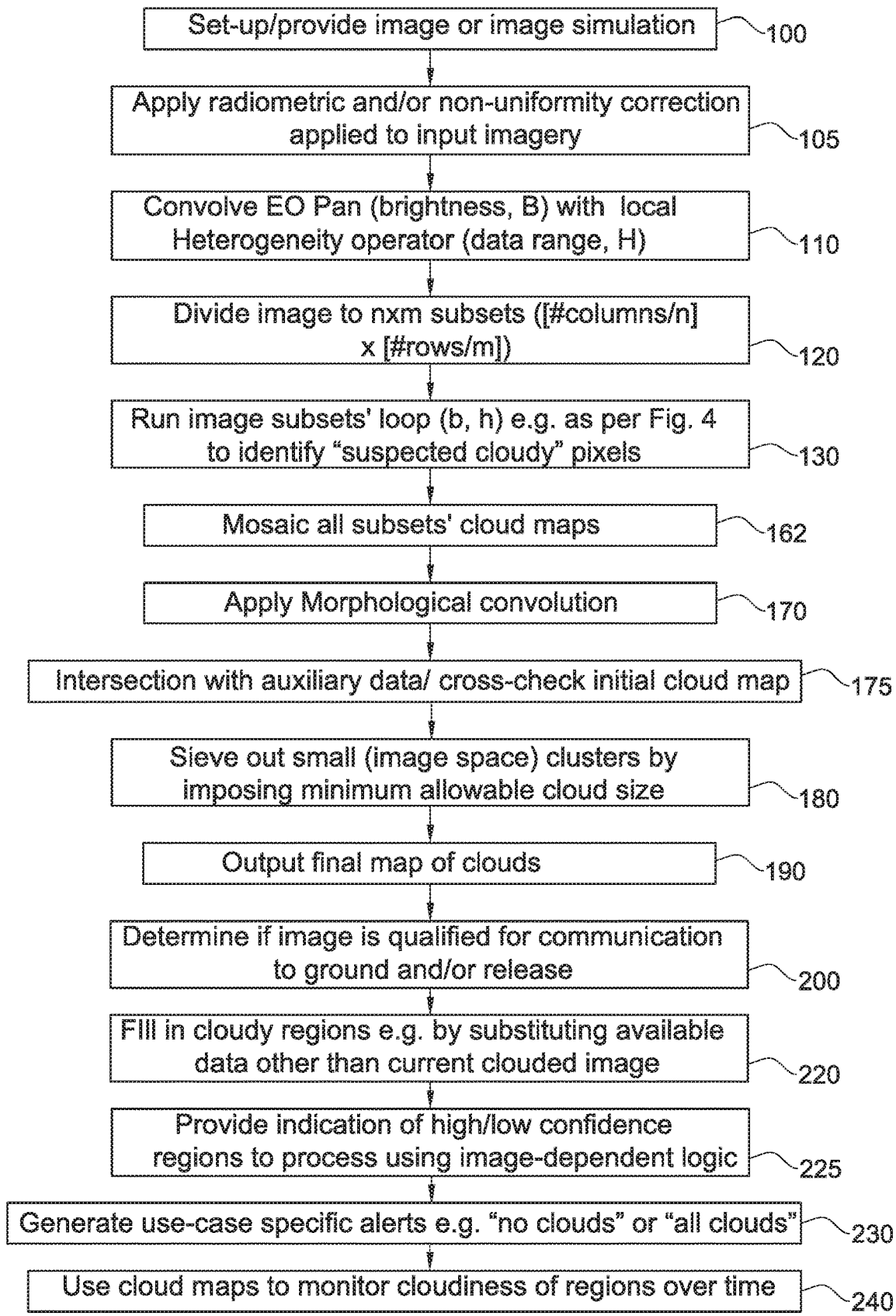
FIG. 3 is a simplified flowchart illustration of a cloud detection method in accordance with certain embodiments.

FIG. 3 is a simplified flowchart illustration of a cloud detection method which may serve as a method of operation for the workflow of FIG. 1; all or any suitable subset of the operations of FIG. 3 may be provided in any suitable order e.g. as shown.

Each operation is now described in detail:

Operation 100: Set-up. provide (e.g. using a satellite or other airborne or space-borne imaging device) a typically panchromatic or monochromatic image of a scene of interest typically stored as an N pixel×M pixel array. Even an image simulation, generated by an "image generator" such as ETES commercially available from vista-geo.de, or DIRSIG commercially available from dirsig.org, which simulates cloud texture and brightness, may be employed.

For example, an image generated by a satellite-borne imager may use 10 exp 8 pixels, each including 8 or 16 bits, to represent several square kilometers of the earth's surface.

It is appreciated that satellite images or other images disturbed by cloudiness may be generated to drive a variety of applications, e.g. for monitoring of status of the area or of some elements within it like agricultural fields, coastlines, disaster areas, transportation networks, etc., and for detection of changes from a previous survey, or detection of some points or materials or objects of interest, like e.g. fleets of cargo ships, certain national facilities etc.

Operation 105: If not already applied by the data provider, relative radiometric correction or absolute radiometric correction or non-uniformity correction may be applied to input imagery to reduce noise that might cause algorithmic failure, by cleaning non-uniformities such as, for example, defected pixels ("bad pixels"), lines, stripes etc. that appear sometimes in raw images, mostly apparent over homogeneous regions in the image.

Operation 110: quantify homogeneity/Heterogeneity of the image at each pixel e.g. by convolving Electro-Optical Pan (brightness, B) with a local Heterogeneity operator (e.g. data range, local variance etc., H). It is appreciated that any suitable measure of local heterogeneity may be employed such as but not limited to data range, a suitable measure of local entropy, any suitable estimate of variance or standard deviation in the relevant vicinity.

Generate a homogeneity/Heterogeneity mapping for the input array e.g. by quantifying the homogeneity/Heterogeneity of the image at each of the image's pixels, for example, by convolving the Electro-Optical (EO) Panchromatic or monochromatic image with a local homogeneity/Heterogeneity operator or kernel.

For example, the "data range" local Heterogeneity operator may be employed; or a 5×5 kernel for local variance may be employed. This process may generate a new array in which each pixel (i,j) stores an indication of the difference between the highest value and lowest value pixels, in a vicinity (say 5×5 pixel vicinity) surrounding pixel (i,j) in the input image of operation 100. For example, the 5×5 pixel vicinity centered about pixel (i,j)=(100,101) in the input array of operation 110 may include 25 input array pixels of which the lowest gray value is 17, the highest is 167 and the remaining 23 input array pixel values are between 17 and 167, or equal to them. In this case, pixel (100, 101) in the new array generated in operation 110 may have the value: 167−17=150.

Known methods are available for computing homogeneity/Heterogeneity for side and corner pixels not possessing a full 5×5 pixel vicinity; or homogeneity/Heterogeneity may not be evaluated for certain side and/or corner pixels.

Operation 120: divide image into subsets

Divide e.g. partition the input image of operation 100 and the homogeneity/Heterogeneity result of operation 110 into matching sub-images ("subsets" or "ROI's") e.g. N×M sub-images for each of: the input image, and the/Heterogeneity result ([# columns/N]×[# rows/M]). This is suitable e.g. if reduction of memory resources during processing is necessary. If this operation is omitted, N=M=1 and the geometric size of the subset or ROI equals the geometric size of B.

Operation 120 is typically performed if prior knowledge such as visual inspection of the input image generated in operation 100, indicates that some of the clouds are so small relative to the full image size, that the cloud might not be detected unless the input image is partitioned. For example, if small clouds are observable to a human operator, but previous use of this method without operation 120 did not succeed in detecting these clouds, the method may be repeated using this method and this time including partitioning operation 120. Each sub-image typically includes [# columns/N]×[# rows/M] pixels i.e. this operation may be performed, for example, by setting the size of the subset to be approximately four times larger than the estimated area of the smallest cloud (or the smallest clear sky region between clouds in case of an almost fully clouded image). In contrast, if clouds larger than a geometric size of an image subset or ROI (region of interest) are observable to a human operator, but previous use of this method with operation 120 did not succeed in detecting these clouds, the method may be repeated this time omitting operation 120 e.g. by setting the size of the subset to be equal to the size of the whole input image.

If no visual inspection of the image is to take place, a default of 100% in image length and 100% in image width may be set (meaning no partition). For example, if the input image provided in operation 100 includes 10 exp 4×10 exp 4 pixels, 1×1 sub-images might be defined, each including 10 exp 4×10 exp 4 pixels.

Operation 130: Run feature-space and image-space transformations on image subsets' loop (b, h) and apply cloud/non-cloud thresholds.

Figure 4:
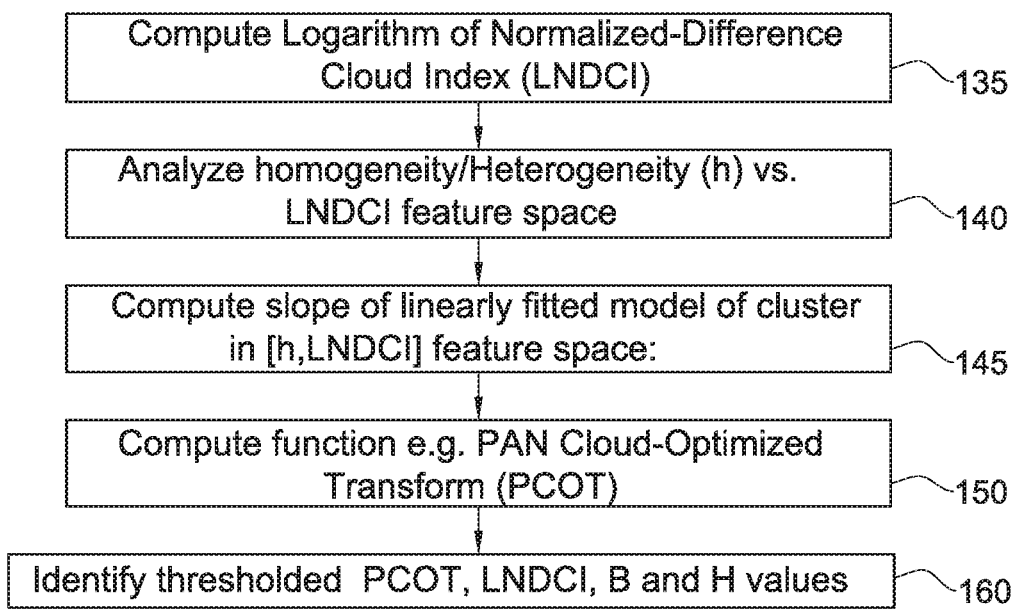
FIG. 4 is a simplified flowchart illustration of a feature-space transformation method which may for example be used to perform the feature-space transformation loop of FIG. 3.

Run an image subset loop, i.e. for each of the subsets, perform feature-space and/or image-space transformations e.g. some or all of operations 135-160 of FIG. 4, either once per subset, or iteratively. If operation 120 is omitted, feature-space and/or image-space transformations may be performed only once or iteratively, on the entire input image provided in operation 100 and its processed intermediate result (H) in operation 110.

To all outputs of transformations apply thresholds for distinguishing between cloud pixels and background (non-cloud) pixels. Such threshold can be deterministic numerical values such as e.g. 0 (zero), statistical values such as mean or standard deviation/s, or any combination thereof. For example, for a feature-space and/or image-space or subset thereof, pixels may be defined as cloudy if their gray levels exceed the mean gray level value in that image/subset by half a standard deviation or more.

Operation 162: After iterating through all ROI's of the input image, generate total initial cloud map by Mosaicking all subsets' cloud maps.

After iterating through all ROI's of the input image, initial cloud maps for all ROI's are mosaiced to yield a total initial cloud map of original input image size by placing each ROI's initial cloud map back into its original image coordinates (e.g. at its appropriate [column, row] position).

The total initial cloud map may then be used for output operation 190. Alternatively or in addition, further cloud map processing may be performed. For example, sieving and/or morphological convolution may be applied to the mosaic of all cloud maps from all ROIs e.g. operations 170 or 175 or 180, or any combination thereof, may be performed, to generate a refined total cloud map.

Operation 170: apply Morphological convolution.

Improve readability of initial cloud map (e.g. by rounding and smoothing clouds' edges), to facilitate visual assessment by a human interpreter e.g. using suitably sized morphological operators, such as but not limited to Dilate, Erode, Close, Open, Region grow, in isolation or in any suitable combination or sequence.

Operation 175: cross-check initial cloud map. For example:

a. use external information if available, to sieve out false alarms. For example, if there are known light-colored homogeneous objects in the scene, such as light colored roofs, these may be sieved out e.g. after performing operation 170, using any suitable criterion for identifying these objects such as their location, size, orientation, or the fact that, unlike clouds, these objects have straight edges.

b. use per-cloud computational procedures to cross-check initial cloud map. For example, each candidate cloud found in the initial cloud map may be inspected separately, e.g. by generating a histogram for the cloud pixel values, and candidate clouds whose histogram is atypical of clouds (e.g. is multi-modal or bi-modal or uni-modal rather than being chaotic) may be discarded.

c. use special procedures to weed out known algorithmic errors, since any image processing method suffers from errors. For example, if a particular flavor of the method shown and described herein (e.g. inclusion of operation 120 as opposed to exclusion thereof) results in an error which confuses "completely cloudy" with "cloudless", a special check may be applied each time the initial cloud map is found by the method to be "completely cloudy". For example, a histogram of cloud pixel values may be generated to differentiate "completely cloudy" from "cloudless" based on accumulated experience regarding the histograms of each of the 2 cases.

Operation 180: Sieve out small (image space) clusters of pixels each including only a small number of pixels clusters e.g. by imposing a minimum allowable cloud size. Groups of detached/isolated pixels identified as clouds in the resulting cloud map of operation 162 may be sieved out e.g. by setting a threshold based on a minimum number of pixels considered a valid size for the smallest expected cloud. This threshold may be related to the spatial resolution of the input image in operation 100. For example, if the spatial resolution of the input image of operation 100 is 1 meter per pixel (square pixels), and the smallest cloud area coverage to be deemed valid is 2500 square meters in size, then the sieving operation may be parameterized such that a minimum of 2500 connected pixels survives sieving. Such sieving may include applying segmentation and size thresholding of the preliminary cloud map generated in operation 162.

Operation 190: Output map of clouds.

This output may have any suitable format, e.g. raster array data such as TIF, JPG, JPEG2000, BMP, PNG, HDF, vector file such as shapefile for a geographical information system (GIS), or text file.

Operation 200: Determine, typically in real time, on board the imaging device or on the ground, whether or not at least one, or each, image is qualified for communication to ground and/or release or alternatively should be suppressed or re-taken.

It is appreciated that the question of whether to re-image once or a predetermined number of times, or until cloudiness dissipates to a predetermined extent, is application dependent. Alternatively e.g. for a non-urgent geological survey, or agricultural survey, the system logic may be configured to simply abort the job and wait for better weather. In one use-case, system logic may be configured to keep trying (keep imaging) until a good clear image has resulted, in which few or no clouds have been identified by the method shown and described herein, and/or, in the meantime, the method herein may be used to identify cloudy regions and cut them out of the image, replacing them with images or maps of the relevant areas available from other sources e.g. a most recent cloudless imaging of the same areas.

Operation 220: fill in cloudy regions resulting from cloud identification operations 120-190 e.g. by substituting original pixels with pixels depicting land areas obscured by the clouds, e.g. using other, typically inferior, less convenient, slower, or more costly, available data regarding said land-areas, and output cloudless map Operation 225: provide an output indication of high-confidence (cloudless) image regions vs. low-confidence (cloudy) image regions to a process using logic derived from the image, thereby to allow the process to rely more on data derived from high-confidence regions than on data derived from low-confidence regions Operation 230: generate "no clouds" or "all clouds" indication, when appropriate, or other use-case specific alerts derivable from a cloud map.

Operation 240: use cloud maps to monitor cloudiness of regions over time

FIG. 4 is a simplified flowchart illustration of a feature-space transformation method which may be used to perform the feature-space transformation and threshold application loop 130 of FIG. 3; all or any suitable subset of the operations of FIG. 4 may be provided in any suitable order e.g. as shown.

Each operation is now described in detail:

Operation 135: compute a function, typically logarithmic, expressing the extent to which each pixel is bright and homogeneous e.g.

Logarithm of Normalized-Difference Cloud Index (LNDCI):

For each pixel in each of the b and h image subsets compute:

$$LNDCI = \log_{10}\left(\frac{b-h}{b+h}\right);$$

This yields an LNDCI array of the same size as the input image subset where each pixel holds a LNDCI value. Alternatively, the logarithmic function may for example be:

LNCI (Log of Normalized Cloud Index)=$\log_{10}((b-h)/b)$.

Figure 5:
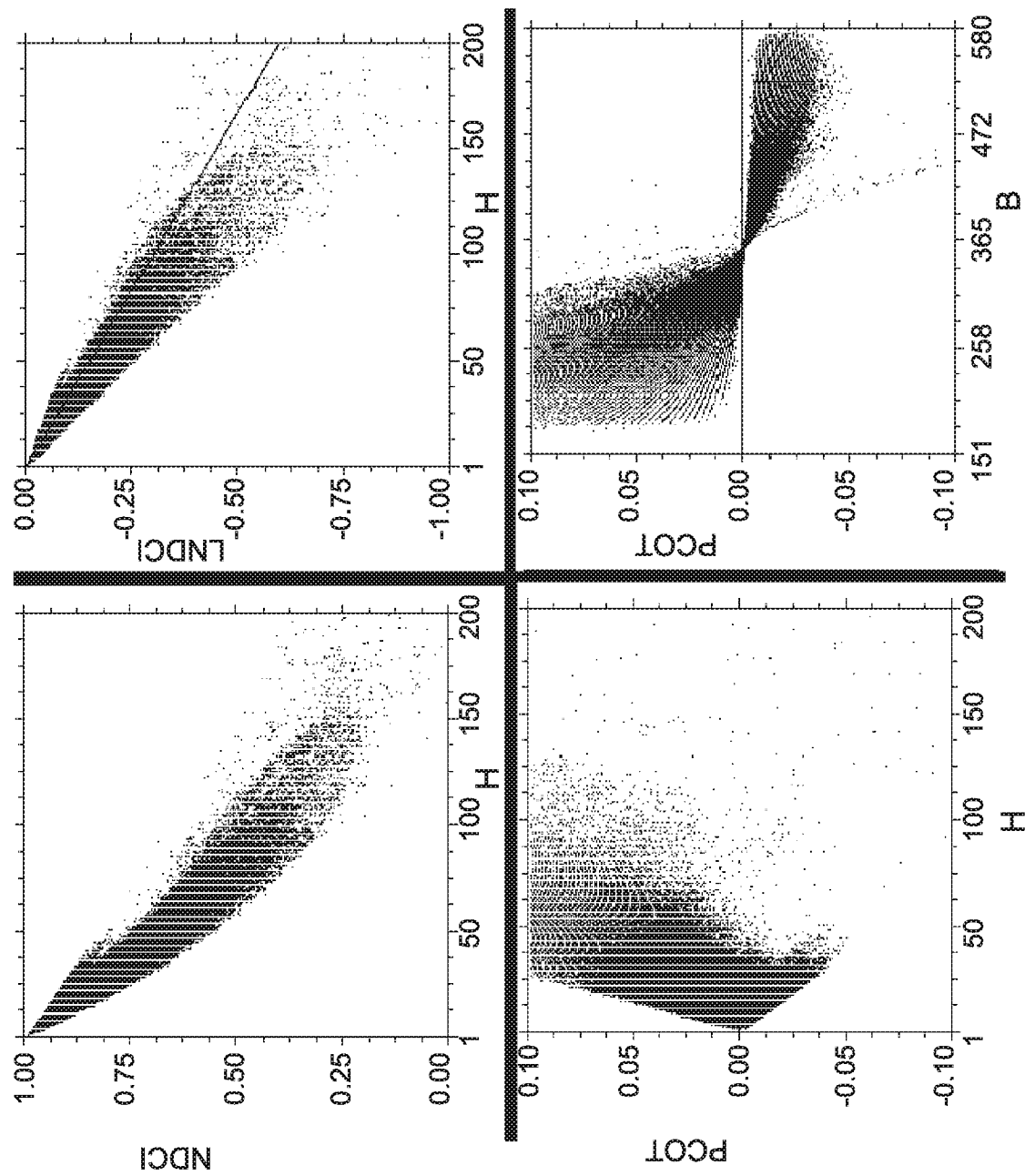
FIG. 5 presents graphs of example distributions in example feature spaces, generated in accordance with certain embodiments of the present invention.

Operation 140: Set homogeneity/Heterogeneity subset (h) vs. LNDCI subset feature space:

In this operation, the homogeneity/Heterogeneity data generated in operation 110 and the LNDCI data generated in operation 135, are used to generate a scattergram or bivariate (2-dimensional) histogram or density function or frequency or probability distribution of the pixels along a homogeneity/Heterogeneity dimension and a LNDCI dimension of the feature space e.g. as shown in FIG. 5.

Typically although not necessarily, each "bin" in the histogram is equally sized, along each of the 2 dimensions, and the number of bins may be set according to a bin size of 1 (one) or equal to the dynamic range or the radiometric resolution of the image (for example to 1 or 2 bytes corresponding to 8 or 16 bits). Typically, for each image subset, the scattergram is defined separately.

Figure 2:
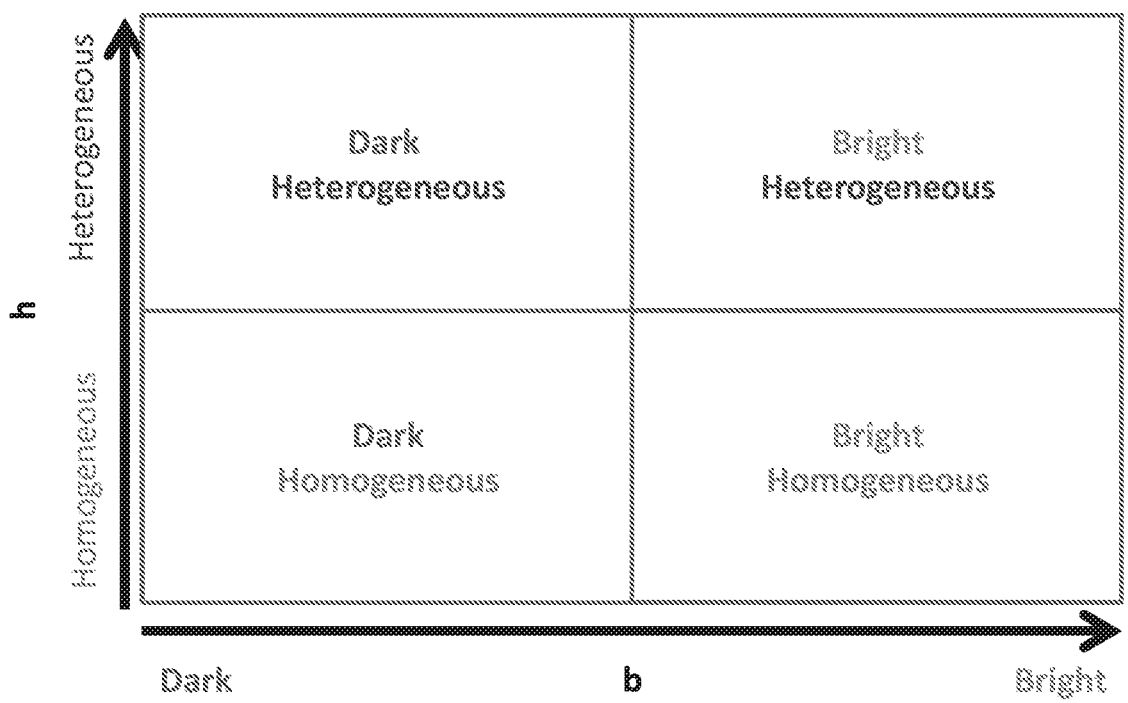
FIG. 2 is a graphic illustration of a heterogeneity vs brightness feature space.

Alternatively or in addition, generate an h vs. b feature space e.g. as shown in FIG. 2.

Operation 145: compute slope of linearly fitted model of feature cluster in [h,LNDCI] feature space:

fit a straight line to the overall resulting distribution (e.g. of all feature clusters together) and extract the fitted line's slope to use as a gain parameter.

Operation 150: Compute panchromatic Cloud-Optimized Transform (PCOT). Intended to include any suitable function e.g. as described below, of gain where gain is a characteristic of a suitable model of the feature cluster in the [h,LNDCI] feature space e.g. the slope of a linear fitted model of the feature cluster in the [h,LNDCI] feature space.

For each pixel in each of the LNDCI and h image subsets compute:

PCOT=$h \times \sin(\text{gain}) - \text{LNDCI} \times w \times \cos(\text{gain})$ Or:

PCOT=$h \times \sin(\text{gain}) + \text{LNDCI} \times w \times \cos(\text{gain})$ Or:

PCOT=$h \times \sin(\text{gain}) - \text{LNCI} \times w \times \cos(\text{gain})$ Or:

PCOT=$h \times \sin(\text{gain}) + \text{LNCI} \times w \times \cos(\text{gain})$ Or any suitable formula which may be subjected to a difference threshold to differentiate clouds from non-clouds in the feature space. w is an empirical model weight.

This may for example yield a PCOT array of the same size of the input image subset, where gain is the slope computed in operation 145 and w is an empirical model weight.

Alternatively to operation 150 or in addition, the method may find pixel-clusters, if any. "Pixel Clusters" may be operationally defined for this purpose, as highly populated regions within the 2-dimensional histogram e.g. brightness-heterogeneity intervals or zones in each of which many pixels reside, and which are surrounded by intervals or zones of Heterogeneity (h OR H) vs. Brightness (B OR b) in which much fewer pixels reside. Conventional software tools and processes for finding pixel clusters in scattergrams exist, such as but not limited to ENVI, ERDAS, PCI geomatics, or MATLAB. alternatively or in addition, "neighborhoods" of cloudy pixels in the image itself may be found e.g. by using known image processing methods to connect adjacent cloudy pixels in the image into a single cloud. optionally, the edges of pixels clusters/clouds may be smoothed e.g. using K-nearest neighbors (KNN), Minimum Distance to Mean, Moving Average, K-means, ISOdata, Maximum Likelihood etc. or any suitable clustering technique e.g. as Described In J. A. Richards (2013) "*Remote Sensing Digital Image Analysis*".

Operation 160: Identify candidate cloud pixels by finding PCOT, LNDCI, B and/or H values falling below or above predetermined threshold/s, e.g. deterministic numeric value's statistical value/s such as mean or standard deviation/s, or any combination thereof. If, for example, the PCOT threshold is zero, this amounts to finding negative PCOT values. The negative (or under-threshold) values from among the PCOT (say) values generated in operation 150 are labeled. For a given ROI, negative PCOT values (or more generally, under-threshold values) may be labeled "suspected as cloudy" since they tend to be associated with bright, homogeneous pixels. All such pixels may be used to generate an initial cloud map for that ROI or subset.

Alternatively, bright, homogeneous pixels in the appropriate quadrant of the [b,h] feature space of FIG. 2 may be identified by any suitable method. A selection may be made by a decision boundary, or threshold, set by recognition of the rate of change in bi-modal or multi-modal primer of feature clusters, for example by applying 1-dimensional or 2-dimensional kernels using derivative convolution approaches. The threshold may be set when applicable for the feature space of the subset of the image, or for the feature space of the image as a whole.

User-controlled parameters may include: (1) whether or not to apply morphological convolution (default is "yes"), and/or (2) whether or not to discard small clouds (default is "yes").

According to one embodiment, there are no other, or few other, user-controlled parameters.

For simplicity, default values rather than user-controlled values may, if desired, be defined for as many as possible of the various parameters used herein. For example, the following default values for the following parameter set has worked well on images "arriving from the field" such as satellite images:

subset size (default value=12000×12000 pixels)
kernel size for morphological convolution (operation 180) (default value=5×5 pixels)
w (pcot rotation weight)(default value=1.5)
rebinning factor for kernel to remove small false alarms in preliminary results by defining the extent to which the morphological kernel should be enlarged
(default=3).
PCOT threshold (operation 160) that defines the "decision boundary" between "cloud" and "other" in the feature space may be a "scalar" or set of values. Default=0.
relative presence of suspected cloud pixels threshold defining, for operation 160, the weight of a "decision boundary" between "cloud" and "other" in the image space. May be a scalar or set of values or a statistical threshold. Default=0.7. For example, if not relevant to a ROI in question (e.g. suspected pixels form less than e.g. 70% of the geometric area of the ROI in question) b pixels (typically connected or adjacent) may be suspected to be clouds if their values are above (mean (b)−Standard deviation(b)), otherwise (e.g. if suspected pixels form more than (say) 70% of the geometric area of the ROI in question) a different, less stringent criterion may be employed e.g. b pixels may be suspected to be clouds if their values are above (mean(b)−1.5×Standard deviation(b)).

It is appreciated that the above parameter set may be employed at least initially and any other suitable parameter set may eventually be employed after suitable use-case specific pilot testing, e.g. if it is desired to adapt to specific design considerations, tasks or operating conditions imposed on specific systems. use-case specific pilot testing may include a first stage in which a suitable "flavor" of the method shown and described herein is test-run, e.g. using the above parameter set, on relatively small images (e.g. 1000× 1000 pixel sub-images "sliced" from 10,000×10,000 pixel satellite images), followed by a second stage in which a suitable "flavor" of the method shown and described herein is run on entire satellite images, using a modified parameter set determined using the results of the first stage. As in the first stage, the parameter set may be modified e.g. by comparing method outputs with visual inspection of the input images or automated sources of knowledge regarding cloud locations in the input images.

According to certain embodiments, threshold cloudiness is set by the client and if image/s fail/s to meet this threshold, the image may be re-acquired. For example, the method of the present invention may be employed to identify geographical areas which are statistically cloudier e.g. in order to apply different fees if the required threshold is difficult to obtain for that area. For example, if the image is to be acquired in a tropical area and a maximum cloud cover of 5% is mandated, a higher fee may be computed since it is anticipated that the image may need to be re-acquired a multiplicity of times until the challenging threshold, given the geographical region, is finally met.

More generally, it is appreciated that a cloud map may be employed for many different applications. For example, satellite images, whose quality and utility are often affected by the presence/absence of clouds, have many applications including but not limited to meteorology, oceanography, fishing, agriculture, biodiversity conservation, forestry, landscape, geology, cartography, regional planning, landcover and land-use mapping, detection of materials of interest etc. Interpretation and analysis of satellite imagery is conducted using specialized remote sensing experts, software or applications which may need to evaluate cloud presence/absence e.g. to quantify confidence and quality in images, determine whether to reacquire them or whether there are gaps of data or information within them that need to be filled with complementary sources of data/information. Also, aerial photography has many applications, including but not limited to cartography e.g. photogrammetric surveys, which are often the basis topographic maps, land-use planning, mapping of archaeological features, including water features (reservoirs, artificially constructed pools and natural ponds), movie production, environmental studies, surveillance, commercial advertising, conveyancing, artistic projects and property analysis e.g. by Phase I Environmental Site Assessments.

Which operations are performed on the cloud map so generated, depends on the use-case. For example (operation 200), a cloud map generated for each of plural images may be used to decide whether or not each image is qualified for release. For example, end-users may request images with no more than an end-user defined percentage, X %, of clouds, or may stipulate that no clouds may be present at specific critical location/s on the ground.

Typically, operation 200 is run in real time, typically in the satellite's computer i.e. onboard, thereby to facilitate a decision by the system regarding image quality and hence whether or not to retake the image. This saves time and resources, since otherwise, memory and power resources on-board are tied up recording the image, perhaps un-necessarily, and then communication bandwidth resources are tied up, perhaps un-necessarily, to send the image to the ground for analysis which may require further time and/or human resources.

Operation 220 typically includes automatic detection of "data gaps" (regions in the image that are obscured by clouds) in order to fill these gaps using data or information of interest pertaining to the same region, such as but not limited to maps, previous images, sources of non-image information characterizing the region e.g. as ocean or forest, etc.

Alternatively or in addition, in suitable contexts, any of the following operations may for example be performed using the output map:

a. determining whether an object or point of interest within the imaged scene falls within an unacceptably cloudy portion of the scene or an acceptably non-cloudy portion of the scene; if the former, delay or cancel operations based on point of interest information which was to have been derived from the image of the scene, until re-imaging has occurred; if the latter, proceed with operations.

b. combining local data about a particular scene characteristic into a single value characterizing the entire scene; including weighting local data which belongs to a non-cloudy location highly because confidence in the data is high, and conversely assigning low weight to local data which belongs to a cloudy location because confidence in the data is low.

c. Determining whether an image is to be transmitted to ground facilities using memory, power, communication bandwidth, time and potentially human resources, or to save these for an alternative acquisition of the same area.

d. Determining whether an image includes data gaps because of cloud obscuring the region of interest, allowing potentially filling these gaps by alternative sources of data or spatial information layers.

The statistical and image processing procedures referred to above, whether on the feature space or on the image, may be implemented using any suitable image processing tool or development language such as but not limited to MATLAB, ENVI/IDL, ERDAS among other data analysis software packages and/or programming languages, software applications used to process and analyze geospatial imagery, and tools for morphological convolution (filtering).

It is appreciated that the method of FIG. 1 may be modified by employing more cloudiness levels (e.g. very cloudy, partly cloudy, slightly cloudy, clear) rather than a binary cloudiness criterion (identifying each pixel as either cloudy or clear). Pixels that have negative (or under-threshold) PCOT values but were later sieved out may for example be labeled "possibly clouded" or "suspected as cloudy".

Various "flavors" of the method of FIG. 1 are useful for one-time imaging. e.g. for deciding whether or not an identified region of interest was cloud free.

Various "flavors" of the method of FIG. 1 are useful for multi-temporal monitoring such as monitoring a site 1/day for 30 days, e.g. for data gap filling. For example a satellite may wish to use cloud detection to generate an n-day cloud free image, by filling any data gaps caused by clouds imaged during those n days, using cloud free pixels from earlier image acquisitions of the same area.

The method shown and described herein may also be useful for differentiating snow covered areas from snow-free areas.

Advantages of embodiments shown and described herein include:

Accurate cloud detection which diminishes the false alarm rate relative to conventional cloud detection processes, may prevent significant work flow delays. For example, if a cloud detection process un-necessarily rejects a satellite photo being used, say, to map or monitor an area of interest, necessitating re-imaging, several days may elapse before the satellite returns to the same position allowing the site of interest to be re-imaged. The ensuing delay in an entire work flow requiring the satellite image may cause un-necessary costs or even unnecessary cancellation of time-critical operations whose work-flow requires the satellite image.

It is appreciated that accurate cloud detection eliminates the need for costly, cumbersome and human error-prone manual cloud detection, e.g. in which human operators manually inspect satellite images and reject those in which the region of interest seems to be insufficiently visible due to occlusion or partial occlusion by clouds; manual cloud detection is still used today.

Accurate cloud detection facilitates quantification of the image quality and/or of the confidence which the system has in the image or portions thereof. Confidence estimation is useful for prioritizing image acquisitions and managing available system and operational resources.

Another advantage of certain embodiments is the ability to distinguish clouds from shadow, e.g. by finding areas with negative (or under-threshold) PCOT values which tend to be cloudy, whereas shaded areas tend to be associated with positive (over-threshold) PCOT values. Such areas may optionally be intersected with over-threshold B, and/or under-threshold H, and/or over-threshold LNDCI value or values.

An advantage of certain embodiments is that in time critical situations, the method of the present invention facilitates rapid decision-making.

Certain embodiments may use only one image of a scene, rather than several images of the same scene e.g. from different angles, wavelengths or times to determine locations of clouds there within.

Certain embodiments may use a panchromatic or monochromatic image, rather than colored images or thermal channel imagery, of a scene, to determine locations of clouds there within.

Certain embodiments may use an image e.g. only one typically panchromatic or monochromatic image of a scene, without requiring any auxiliary information such as predictions or measurements of atmospheric profiling or mapping of constituents, gases, aerosols or temperatures, or any of their combinations, or at least without requiring a stream of auxiliary information in real time, to determine locations of clouds in the scene.

Certain embodiments derive pixel-level cloud information from an input image comprising pixels; in contrast certain prior art cloud detection methods identify presence or absence of clouds in each of a plurality of areas, each of which comprises many pixels, such as dozens of pixels, hundreds of pixels, or even more.

A particular advantage of certain systems and methods shown and described herein is the ability to find clouds efficiently, e.g. in real time, in remotely sensed images typically without resorting to auxiliary sensed data nor meta-data e.g. in real time.

It is appreciated that relating to large areas may cause false rejections of satellite images since a small region of interest may be within an area rejected as cloudy using conventional cloud detection methods, however certain embodiments herein would identify that the point of interest was located within a pixel or small number of pixels, which are not cloudy, although most of the pixels within the area within which that point of interest is located are indeed cloudy, causing the entire area to have been deemed cloudy by conventional methods.

Also, the pixel-level data generated according to certain embodiments is advantageous for use-cases in which action one is taken if the percentage of cloudiness in a scene exceeds P %, and action two, e.g. no action, is taken if the percentage of cloudiness in a scene falls below P %. Here too costly or critical false alarms may be prevented by certain embodiments e.g. if small (e.g. order of magnitude of 1-500 pixel/s) very cloudy locations are interspersed with small (ditto) locations which are borderline clear. When this is the case, multi-pixel areas may be wrongly labeled cloudy by conventional methods, when very cloudy locations and borderline clear locations are averaged to yield values which exceed the cloudiness threshold, thereby unnecessarily pushing the % cloudiness result over P %.

Functions referred to herein are intended to include, inter alia, the unity function.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order; a computer program product comprising a computer useable medium having computer readable program code, such as executable code, having embodied therein, and/or including computer readable program code, for performing any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients' e.g. mobile communication devices such as smartphones may be operatively associated with, but external to, the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A computer-implemented method for identifying clouds in a digital image, formed of pixels, of a scene, for at least one image I of at least one respective scene S, the method comprising:

for each scene S represented by an image I:
  quantifying at least one heterogeneity/homogeneity characteristic in each of a multiplicity of locations within a digital image of a scene, by computing, for at least one individual location which defines a vicinity of locations spatially adjacent thereto within the image, at least one function which varies monotonically as a function of the individual location's vicinity's homogeneity thereby to define at least one characteristic, indicative of local heterogeneity/homogeneity within the image, for the individual location;
  comparing at least one function of the at least one characteristic indicative of local heterogeneity/homogeneity to at least one local heterogeneity/homogeneity threshold including generating at least one comparison result; and
  using a controller for generating an output identifying clouds in the digital image, including at least one of:
    identifying a presence of cloudiness at at least one first location in the digital image, at least partly because the at least one comparison result indicates that the first location falls on a first side of the at least one local heterogeneity/homogeneity threshold, and
    identifying an absence of cloudiness at at least one second location in the digital image, at least partly because the at least one comparison result indicates that the second location falls on a second side of the at least one local heterogeneity/homogeneity threshold, wherein:
  the threshold is determined in a set-up stage in which relatively bright and homogeneous feature-clusters are differentiated from at least one of less bright feature clusters and less homogeneous feature clusters, the relatively bright and homogeneous feature clusters are identified by applying a clustering method, and the feature space clustering method includes at least one of:
  a transformation of said clusters' shapes in the feature space;
  a projection of the clusters to new feature space axes;
  an application of derivative approaches on the primers/boundaries of the clusters; and
  an application of derivative approaches on the cross-sections of the clusters.

2. The method according to claim 1, wherein
for at least one scene S:
  the quantifying comprises quantifying heterogeneity and brightness in each of a multiplicity of locations in a digital image of scene S;
  the comparing comprises comparing at least one function of at least one of the heterogeneity and the brightness to at least one threshold including generating at least one comparison result indicating whether an individual location from among the multiplicity of locations is both homogeneous and bright, or whether the individual location is heterogeneous and/or dark; and
  the generating of an output comprises:
    identifying a presence of cloudiness at at least one first location in the digital image, at least partly because the at least one comparison result indicates that the first location is both homogeneous and bright to an extent determined by the at least one threshold.

3. The method according to claim 2, further comprising:
aggregating adjacent locations at which cloudiness has been identified into pixel-clusters.

4. The method according to claim 3, further comprising discounting at least one location at which cloudiness has been identified and the location does not belong to any of the clusters by generating an output indicating presence of cloudiness only in "clustered" locations found to belong in a cluster and not in "non-clustered" locations at which cloudiness has been identified and the location does not belong to any of the clusters.

5. The method according to claim 2, wherein the comparing comprises:
  comparing functions of heterogeneity and brightness to define a Logarithm of Normalized-Difference Cloud Index (LNDCI);
  generating a scattergram representing a distribution of the LNDCI and a function of the heterogeneity and define a gain parameter by computing a slope of a linear model fitted to the scattergram; and
  comparing a function of the gain to at least one cloud-defining threshold value.

6. The method according to claim 2, wherein the comparing of at least one function of the heterogeneity and the brightness to at least one cloud-defining threshold comprises:
  comparing a first function of the heterogeneity to a first cloud-defining threshold in a feature space, comprising at least one heterogeneity threshold value in the feature space; and
  comparing a second function of the brightness to a second cloud-defining threshold in a feature space, comprising at least one brightness threshold value in the feature space.

7. The method according to claim 2, wherein the at least one function comprises an LNDCI Logarithm of Normalized-Difference Cloud Index (LNDCI) operator.

8. The method according to claim 2, wherein the at least one function comprises a Panchromatic Cloud-Optimized Transform (PCOT) operator.

9. The method according to claim 1, and wherein the generating of an output also comprises identifying at least one location whose comparison result comprises an intermediate-level result indicating that the location is not homogeneous and bright to an extent determined by the at least one threshold, but also is not heterogeneous and/or dark to an extent determined by the at least one threshold.

10. The method according to claim 9, further comprising:
  determining whether or not a region of interest within the digital image is occluded by the location at which the at least one comparison result indicates that the location is both homogeneous and bright; and
  discounting the image if so and utilizing the image if not.

11. The method according to claim 1, wherein the threshold is determined in a set-up stage in which relatively bright and under-threshold feature-clusters are differentiated from at least one of less bright feature clusters and over-threshold feature clusters.

12. The method according to claim 1, wherein generating an output identifying clouds in the digital image occurs without resort to imagery from different imaging angles.

13. The method according to claim 1, wherein generating an output identifying clouds in the digital image occurs without resort to imagery at different times.

14. The method according to claim 1, wherein for at least one scene S the quantifying comprises identifying absence of cloudiness at at least one second location in the digital image, at least partly because the at least one comparison result indicates that the second location is heterogeneous to an extent determined by the at least one threshold.

15. The method according to claim 1, wherein for at least one scene S the quantifying comprises identifying absence of cloudiness at at least one second location in the digital image, at least partly because the at least one comparison result indicates that the second location is dark to an extent determined by the at least one threshold.

16. The method according to claim 1, wherein the image comprises a single remotely sensed panchromatic or monochromatic image.

17. A system for identifying clouds in a digital image of a scene, the system comprising:
  a processor operative for quantifying heterogeneity and brightness in each of a multiplicity of locations in a digital image of a scene and for comparing at least one function of the heterogeneity and the brightness to at least one threshold, including generating at least one comparison result indicating: (a) whether an individual location from among the multiplicity of locations is both homogeneous and bright, or (b) whether the individual location is heterogeneous and/or dark; and
  an output generator comprising a hardware processor operative for generating an output identifying clouds in the digital image, including at least one of:
    generating an output identifying presence of cloudiness at at least one first location in the digital image, at least partly because the at least one comparison result indicates that the first location is both homogeneous and bright to an extent determined by the at least one threshold, and
    generating an output identifying absence of cloudiness at at least one second location in the digital image, at least partly because the at least one comparison result indicates that the second location is heterogeneous and/or dark to an extent determined by the at least one threshold, wherein:
the output generator that is operative for generating an output is also operative for identifying at least one location whose comparison result comprises an intermediate-level result indicating that the location is not homogeneous and bright to an extent determined by said at least one threshold, but also is not heterogeneous and/or dark to an extent determined by said at least one threshold.

18. The system of claim 17, wherein the output is presented to at least one end-user via an output device.

19. A computer program product comprising:
a non-transitory tangible computer readable medium having computer readable program code embodied therein, the computer readable program code causing a computer to execute a method for identifying clouds in a digital image of a scene, the method including:
quantifying heterogeneity and brightness in each of a multiplicity of locations in a digital image of a scene;
comparing at least one function of at least one of the heterogeneity and the brightness to at least one threshold including generating at least one comparison result indicating whether an individual location from among the multiplicity of locations is both homogeneous and bright, or whether the individual location is heterogeneous and/or dark; and
using a controller for generating an output identifying clouds in the digital image, including at least one of:
identifying presence of cloudiness at at least one first location in the digital image, at least partly because the at least one comparison result indicates that the first location is both homogeneous and bright to an extent determined by the at least one threshold, and
identifying absence of cloudiness at at least one second location in the digital image, at least partly because the at least one comparison result indicates that the second location is heterogeneous and/or dark to an extent determined by the at least one threshold, wherein:
for at least one scene S:
the quantifying comprises quantifying heterogeneity and brightness in each of a multiplicity of locations in a digital image of scene S;
the comparing comprises comparing at least one function of at least one of said heterogeneity and said brightness to at least one threshold including generating at least one comparison result indicating whether an individual location from among the multiplicity of locations is both homogeneous and bright, or whether the individual location is heterogeneous and/or dark; and
the generating of an output comprises:
identifying presence of cloudiness at at least one first location in the digital image, at least partly because the at least one comparison result indicates that the first location is both homogeneous and bright to an extent determined by said at least one threshold, and
the at least one function is selected from a group of operators comprising: an Logarithm of Normalized-Difference Cloud Index (LNDCI) operator, and a Panchromatic Cloud-Optimized Transform (PCOT) operator.

20. The computer program product according to claim 19, wherein the image comprises a single remotely sensed panchromatic or monochromatic image.

\* \* \* \* \*